United States Patent
Nienkemper et al.

(10) Patent No.: US 8,663,414 B2
(45) Date of Patent: Mar. 4, 2014

(54) POLYURETHANE-BASED PULTRUSION RESIN SYSTEM

(75) Inventors: Katrin Nienkemper, Osnabrueck (DE); Bert Neuhaus, Dinslaken (DE); Daniela Fisser-Schmalkuche, Bad Essen (DE)

(73) Assignee: BASF SE, Ludwigshafen (DE)

( * ) Notice: Subject to any disclaimer, the term of this patent is extended or adjusted under 35 U.S.C. 154(b) by 81 days.

(21) Appl. No.: 13/513,471

(22) PCT Filed: Nov. 30, 2010

(86) PCT No.: PCT/EP2010/068518
§ 371 (c)(1),
(2), (4) Date: Jun. 1, 2012

(87) PCT Pub. No.: WO2011/067246
PCT Pub. Date: Jun. 9, 2011

(65) Prior Publication Data
US 2012/0252973 A1    Oct. 4, 2012

(30) Foreign Application Priority Data
Dec. 1, 2009   (EP) .................................... 09177603

(51) Int. Cl.
*B29C 70/52*   (2006.01)
(52) U.S. Cl.
USPC . 156/166; 264/137; 525/440.01; 525/440.11; 525/452; 525/453; 525/454
(58) Field of Classification Search
USPC ......... 156/166; 264/137; 525/440.01, 440.11, 525/452, 453, 454
See application file for complete search history.

(56) References Cited

U.S. PATENT DOCUMENTS

| | | | | |
|---|---|---|---|---|
| 4,868,224 A | * | 9/1989 | Harasin et al. | 521/124 |
| 4,954,537 A | * | 9/1990 | Sanns, Jr. | 521/157 |
| 2006/0173128 A1 | * | 8/2006 | Connolly | 524/589 |
| 2007/0113983 A1 | | 5/2007 | Brown et al. | |
| 2007/0116941 A1 | | 5/2007 | Brown et al. | |
| 2007/0117921 A1 | | 5/2007 | Brown et al. | |
| 2008/0087373 A1 | | 4/2008 | Hayes et al. | |
| 2008/0090921 A1 | | 4/2008 | Hayes et al. | |
| 2008/0090966 A1 | | 4/2008 | Hayes et al. | |

FOREIGN PATENT DOCUMENTS

| | | |
|---|---|---|
| DE | 196 44 017 | 5/1998 |
| WO | 2005 038118 | 4/2005 |
| WO | 2005 049301 | 6/2005 |

OTHER PUBLICATIONS

International Search Report Issued Feb. 28, 2011 in PCT/EP10/68518 Filed Nov. 30, 2010.

* cited by examiner

*Primary Examiner* — Robert Jones, Jr.
(74) *Attorney, Agent, or Firm* — Oblon, Spivak, McClelland, Maier & Neustadt, L.L.P.

(57) ABSTRACT

The present invention relates to a pultrusion resin system, comprising (a) di- or polyisocyanates, (b) compounds having at least two groups reactive toward isocyanates, (c) catalyst, (d) polybasic acid with functionality greater than or equal to 2 and, optionally, (e) further auxiliaries and additives, where the boiling point of the polybasic acid is at least 200° C. at standard pressure and it is soluble in the compound having at least two groups reactive toward isocyanates. The invention further relates to a process for producing a pultrudate, and also to this pultrudate.

20 Claims, No Drawings

POLYURETHANE-BASED PULTRUSION RESIN SYSTEM

The present invention relates to a pultrusion resin system, comprising (a) di- or polyisocyanates, (b) compounds having at least two groups reactive toward isocyanates, (c) catalyst, (d) polybasic acid with functionality greater than or equal to 2 and, optionally, (e) further auxiliaries and additives, where the boiling point of the polybasic acid is at least 200° C. at standard pressure and it is soluble in the compound having at least two groups reactive toward isocyanates. The invention further relates to a process for producing a pultrudate, and also to this pultrudate.

The pultrusion process is a continuous process for producing fiber-reinforced profiles with constant cross section. A pultrusion plant is typically composed of an impregnation unit and of a heated die, and also of a take-off system, which is responsible for the continuity of the process. The impregnation of the fibers takes place in an open bath or in a closed injection box. Here, the reinforcement material, for example glassfiber rovings or glassfiber mats, is wetted with the resin. The composite is then shaped and hardened in the heated die. A take-off system draws the finished profile out of the die, and it is finally cut to the desired lengths. To maximize the efficiency of the pultrusion process, it is desirable to use high process speeds, while at the same time the pultrudate has very good mechanical properties and high surface quality.

Bayer, Huntsman, Milgard Manufacturing Incorporated, Resin Systems Inc., and others have described the use of two-component polyurethane systems for the pultrusion process. The materials used are mainly polyether polyols having functionality of 3.0, these being reacted with isocyanates, often polymeric MDI, in the presence of amines and, respectively, metal complexes as catalysts, and also of various additives. It has been found here that surface quality becomes poorer as process speed increases. Polyurethane or PU powder, the final product of the reaction, is often found on the surface of the profile. Other features observed at high take-off speeds are poorer quality of wetting and resultant poorer mechanical properties of the corresponding pultrudates. Again, these phenomena limit the maximum speed of the process.

In WO 2005/049301, Huntsman counters this problem by using two metal catalysts. Bayer uses systems based on DMC polyols (U.S. 2008/0090921) or on graft polyols (U.S. 2008/0087373), or uses immiscible PU systems (U.S. 2008/0090996). Both Bayer and Huntsman moreover mention the principle of use of acids for partial neutralization, i.e. blocking, of the amine catalysis. Specific examples mentioned in WO 2005038118 are formic acid, acetic acid, 2-ethylhexanoic acid, and oleic acid.

In U.S. 2007/0113983, U.S. 2007/0116941, and U.S. 2007/0117921, Milgard Manufacturing Incorporated says that it is in principle possible, in order to improve surface quality, to add polymeric additives to the polyurethane system, where these additives reduce shrinkage of the resin. The preferred concentration of these "low profile additives" added is from 4 to 10%, based on the entire resin system. Polymeric additives here are polystyrenes, styrene-acrylate copolymers, methacrylate resins, polyvinyl acetates, and protected polypropylene oxides.

None of the approaches discussed in the prior art provides a satisfactory solution for producing pultrudates with good surface quality at high pultrusion speeds, in particular for relatively complex profile geometries. It was therefore an object of the present invention to provide a pultrusion resin system which gives pultrudates with excellent surface quality at high pultrusion speeds of more than one meter per minute, in particular for relatively complex profile geometries.

Surprisingly, it has been found that the object of the invention is achieved via a pultrusion resin system comprising (a) di- or polyisocyanates, (b) compounds having at least two groups reactive toward isocyanates, (c) catalyst, (d) polybasic acid with functionality greater than or equal to 2 and, optionally, (e) further auxiliaries and additives, where the boiling point of the polybasic acid is at least 200° C. at standard pressure and it is soluble in the compound having at least two groups reactive toward isocyanates.

For the purposes of this invention, a pultrusion resin system is a system composed of various components which is suitable, after the components have been mixed together, to form a pultrudate using fiber material.

The di- or polyisocyanates (a) used can be any of the aliphatic, cycloaliphatic, or aromatic isocyanates known for producing polyurethanes. Examples are diphenylmethane 2,2'-, 2,4-, and 4,4'-diisocyanate, the mixtures of monomeric diphenylmethane diisocyanates and of diphenylmethane diisocyanate homologs having a greater number of rings (polymeric MDI), isophorone diisocyanate (IPDI) or its oligomers, tolylene diisocyanate (TDI), for example tolylene diisoyanate isomers such as tolylene 2,4- or 2,6-diisocyanate, or a mixture of these, tetramethylene diisocyanate or its oligomers, hexamethylene diisocyanate (HDI) or its oligomers, naphthylene diisocyanate (NDI), or a mixture thereof.

The di- or polyisocyanates (a) used preferably comprise isocyanates based on diphenylmethane diisocyanate, in particular comprising polymeric MDI. The functionality of the di- and polyisocyanates (a) is preferably from 2.0 to 2.9, particularly preferably from 2.1 to 2.8. The viscosity of the di- or polyisocyanates (a) at 25° C. to DIN 53019-1 to 3 here is preferably from 5 to 600 mPas and particularly preferably from 10 to 300 mPas.

Di- and polyisocyanates (a) can also be used in the form of polyisocyanate prepolymers. These polyisocyanate prepolymers are obtainable by reacting an excess of the polyisocyanates described above (constituent (a-1)) with compounds (constituent (a-2)) having at least two groups reactive toward isocyanates, for example at temperatures of from 30 to 100° C., preferably at about 80° C., to give the prepolymer. The NCO content of polyisocyanate prepolymers of the invention is preferably from 20 to 33% by weight of NCO, particularly preferably from 25 to 32% by weight of NCO.

Compounds (a-2) having at least two groups reactive toward isocyanates are known to the person skilled in the art and are described by way of example in "Kunststoffhandbuch, 7, Polyurethane" [Plastics Handbook, 7, Polyurethanes] Carl Hanser-Verlag, 3rd edition, 1993, chapter 3.1. Examples of compounds that can be used, having at least two groups reactive toward isocyanates, are therefore polyether- or polyesterols such as those described under (b) below. The compounds (a-2) used having at least two groups reactive toward isocyanates are preferably polyether- or polyesterols comprising secondary OH groups, an example being polypropylene oxide. The functionality of these polyether- or polyesterols is preferably from 2 to 4, particularly preferably from 2 to 3.

It is particularly preferable to use no polyisocyanate prepolymers.

The compounds (b) used having at least two groups reactive toward isocyanates, also termed "polyols" for the purposes of this invention, can comprise any of the compounds having at least two groups reactive toward isocyanates, examples being OH, SH, NH, $NH_2$, —COON, and CH-acidic groups, where the proportion of secondary OH groups, based on the number of groups reactive toward isocyanates, is at least 50%, preferably at least 60%, particularly preferably at least 70%, and in particular at least 80%.

It is usual to use polyetherols and/or polyesterols having from 2 to 8 hydrogen atoms reactive toward isocyanate, and to use low-molecular-weight polyols, such as glycerol, dipropylene glycol, and/or tripropylene glycol. The OH number of these compounds is usually in the range from 30 to 2000 mg KOH/g, preferably in the range from 40 to 1000 mg KOH/g. The average OH number of all of the compounds (b) used here having at least two groups reactive toward isocyanates is from 100 to 1000 mg KOH/g, preferably from 300 to 900 mg KOH/g.

The polyetherols are obtained by known processes, for example via anionic polymerization of alkylene oxides with addition of at least one starter molecule comprising from 2 to 8, preferably from 2 to 6, and particularly preferably from 2 to 4, reactive hydrogen atoms, in the presence of catalysts. Catalysts used can comprise alkali metal hydroxides, such as sodium hydroxide or potassium hydroxide, or alkali metal alcoholates, such as sodium methoxide, sodium ethoxide, potassium ethoxide, or potassium isopropoxide, or, in the case of cationic polymerization, Lewis acids, such as antimony pentachloride, boron trifluoride etherate, or bleaching earth. Other catalysts that can be used are double-metal cyanide compounds, known as DMC catalysts.

The alkylene oxides used preferably comprise one or more compounds having from 2 to 4 carbon atoms in the alkylene moiety, e.g. tetrahydrofuran, ethylene oxide, propylene 1,2-oxide, butylene 1,2-oxide or butylene 2,3-oxide, in each case alone or in the form of a mixture, and preferably propylene 1,2-oxide and/or ethylene oxide, in particular propylene 1,2-oxide.

Examples of starter molecules that can be used are ethylene glycol, diethylene glycol, glycerol, trimethylolpropane, pentaerythritol, sugar derivatives, such as sucrose, hexitol derivatives, such as sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3-propanediamine, 1,6-hexanediamine, ethanolamine, diethanolamine, triethanolamine, and also other di- or polyhydric alcohols, or di- or polybasic amines.

The polyester alcohols used are mostly produced via condensation of polyhydric alcohols having from 2 to 12 carbon atoms, e.g. ethylene glycol, diethylene glycol, butanediol, trimethylolpropane, glycerol, or pentaerythritol, with polybasic carboxylic acids having from 2 to 12 carbon atoms, e.g. succinic acid, glutaric acid, adipic acid, suberic acid, azelaic acid, sebacic acid, decanedicarboxylic acid, maleic acid, fumaric acid, phthalic acid, isophthalic acid, terephthalic acid, and the isomers of naphthalenedicarboxylic acids, or their anhydrides.

Other starting materials that can also be used concomitantly in producing the polyesters are hydrophobic substances. The hydrophobic substances are substances insoluble in water which comprise a nonpolar organic moiety, and which also have at least one reactive group selected from hydroxy, carboxylic acid, carboxylic ester, or a mixture thereof. The equivalent weight of the hydrophobic materials is preferably from 130 to 1000 g/mol. Examples of materials that can be used are fatty acids, such as stearic acid, oleic acid, palmitic acid, lauric acid, or linoleic acid, and also fats and oils, e.g. castor oil, maize oil, sunflower oil, soybean oil, coconut oil, olive oil, or tall oil. If polyesters comprise hydrophobic substances, the proportion of the hydrophobic substances, based on the total monomer content of the polyester alcohol, is preferably from 1 to 30 mol %, particularly preferably from 4 to 15 mol %.

The functionality of the polyesterols used is preferably from 1.5 to 5, particularly preferably from 1.8 to 3.5.

In one particularly preferred embodiment, the compounds (b) having groups reactive toward isocyanates comprise polyetherols, in particular exclusively polyetherols. The actual average functionality of the polyetherols is preferably from 2 to 4, particularly preferably from 2.5 to 3.5, in particular from 2.8 to 3.2, and their OH number is preferably from 300 to 900 mg KOH/g, and their content of secondary OH groups is preferably at least 50%, with preference at least 60%, with particular preference at least 70% and in particular at least 80%. The polyetherol used here preferably comprises polyetherol based on based on glycerol as starter and on propylene-1,2-oxide.

The catalysts (c) used can comprise any of the catalysts conventional for producing polyurethane. These catalysts are described by way of example in "Kunststoffhandbuch, Band 7, Polyurethane" [Plastics Handbook, volume 7, Polyurethanes] Carl Hanser Verlag, 3rd edition 1993, chapter 3.4.1. Examples of those that can be used here are organometallic compounds, such as complexes of tin, of zinc, of titanium, of zirconium, of iron, of mercury, or of bismuth, preferably organotin compounds, such as stannous salts of organic carboxylic acids, e.g. stannous acetate, stannous octoate, stannous ethylhexanoate, and stannous laurate, and the dialkyltin (IV) salts of carboxylic acids, e.g. dibutyltin diacetate, dibutyltin dilaurate, dibutyltzin maleate, and dioctyltin diacetate, and also phenylmercury neodecanoate, bismuth carboxylates, such as bismuth(III) neodecanoate, bismuth 2-ethylhexanoate, and bismuth octanoate, or a mixture. Other possible catalysts are strongly basic amine catalysts. Examples of these are amidines, such as 2,3-dimethyl-3,4,5,6-tetrahydropyrimidine, tertiary amines, such as triethylamine, triethylenediamine, tributylamine, dimethylbenzylamine, N-methyl, N-ethyl, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl) urea, dimethylpiperazine, 1,2-dimethylimidazole, 1-azabicyclo[3.3.0]octane, and preferably 1,4-diazabicyclo[2.2.2]octane, 1,8-diazabicyclo[5.4.0]-undecen-7-ene, and alkanolamine compounds, such as triethanolamine, triisopropanolamine, N-methyl- and N-ethyldiethanolamine, and dimethylethanolamine. The catalysts can be used individually or in the form of a mixture. Mixtures of metal catalysts and of basic amine catalysts are optionally used as catalysts (c).

In one particular embodiment, these catalysts are used in the form of blocked catalysts, an example being catalysts blocked with proton donors. Proton donors preferably used comprise carboxylic acids or phenols, and/or other aromatic alcohols. Particularly preferred proton donors used comprise aromatic alcohols. The molar ratio here of groups acting as proton donor in the proton donor to protonatable amine groups in the amine catalyst is preferably from 0.9:1.0 to 1.1:1.0. It is particularly preferable that the blocked amine catalyst used here comprises blocked 1,8-diazabicyclo[5.4.0] undec-7-ene. Phenols or carboxylic acid derivatives can be used as possible blocking agents, an example being phenol or phthalic acid.

The proportion of the catalyst (c) here is preferably from 0.05 to 10% by weight, particularly preferably from 0.1 to 5% by weight, and in particular from 0.1 to 2.5% by weight, based on the total weight of components (b) to (e). The manner of use of the catalyst here is preferably such that the gel time of the pultrusion resin system of the invention is greater than 10 minutes at 25° C., after mixing of components (a) to (e), particularly preferably greater than 12 minutes and smaller than 60 minutes, and in particular greater than 15 minutes and smaller than 60 minutes. The selection of the catalyst is moreover such that complete hardening of the pultrusion resin system of the invention takes place at 220° C. within 60 seconds after mixing of components (a) to (e), particularly preferably from 0 to 45 seconds, and in particular from 5 to 30 seconds.

For determining the gel time here, the components for producing the polyurethane reaction mixture are weighed into a beaker at room temperature and mixed with one another at 2000 revolutions per minute for 30 seconds in a high-speed mixer. 100 g of the entire system are then weighed into a separate beaker, and the gel time is determined with the aid of a wooden spatula. The gel time corresponds to the time difference between the start of the mixing process and hardening, i.e. initial formation of clumps.

For determination of full hardening at 220° C., the components for producing the polyurethane reaction mixture are weighed into a beaker at room temperature and mixed with one another at 2000 revolutions per minute for 30 seconds in a high-speed mixer. 10 mL of the system are placed on a plate with surface temperature 220° C., with the aid of a Pasteur pipette. The time (in s) between application to the plate and complete hardening gives the hardening time at the corresponding temperature. Complete hardening has been achieved when the specimen no longer adheres on contact with a wooden spatula.

The polybasic acid (d) is an acid of functionality two or greater having a boiling point of at least 200° C. at standard pressure. It is essential to this invention that the acid is soluble in the compound (b) having at least two groups reactive toward isocyanate. For the purposes of the invention, the solubility of the acid here in the compound (b) having at least two groups reactive toward diisocyanate means that, at 25° C., a concentration of at least 0.1% by weight, preferably at least 1% by weight, particularly preferably at least 2% by weight, and in particular at least 5% by weight, of the acid gives, in component (b), a stable system which does not separate into two or more macroscopically separate phases even after standing for one week at room temperature. Macroscopically separate phases here are phases which differ from one another in the concentration of the acid and comprise at least regions of diameter 0.1 mm.

Acids here are any of the substances having a pKa value smaller than 15, particularly preferably smaller than 7, and in particular smaller than 4. The pKa value here relates to dissociation of the first proton. It is preferable that the polybasic acids (d) comprise at least one acid group selected from carboxylic acid groups, phosphonic acid groups, phosphoric acid groups, and sulfonic acid groups. The polybasic acids (d) can also comprise, alongside the at least two acid groups, groups reactive toward isocyanate, e.g. OH groups, SH groups, NH groups, or $NH_2$ groups. The acid number of the polybasic acid is preferably from 50 to 1000 mg KOH/g, particularly preferably from 80 to 900 mg KOH/g, and in particular from 100 to 800 mg KOH/g. It is preferable that the polybasic acids have a high proportion of heteroatoms, in particular of oxygen. By way of example, the molar ratio of oxygen to carbon in the acid is preferably at least 1:5, particularly preferably at least 1:4. Examples of these acids (d) are condensates derived from polybasic acids and from compounds having groups reactive toward acids, where these can react with elimination of water to give the condensates. Examples of polybasic acids that can be used for producing the condensates are polybasic carboxylic acids such as aliphatic polybasic carboxylic acids, e.g. succinic acid, glutaric acid, adipic acid, suberic acid, azelaic acid, sebacic acid, decanedicarboxylic acid, maleic acid, and fumaric acid, or aromatic polybasic carboxylic acids, such as phthalic acid, isophthalic acid, terephthalic acid, naphtalenedicarboxylic acids and isomers thereof or inorganic acids, such as phosphoric acid. Examples of compounds that have groups reactive toward acids and that can be used for producing the condensates are any of the compounds described under (b) having groups reactive toward isocyanates, preferably polyetherols based on alkylene oxides, polyesterols, and also low-molecular-weight compounds, such as ethylene glycol, diethylene glycol, glycerol, trimethylolpropane, pentaerythritol, sugar derivatives, such as sucrose, hexitol derivatives, such as sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3-propanediamine, 1,6-hexanediamine, ethanolamine, diethanolamine, triethanolamine, and also other di- or polybasic alcohols or amines. If the intention here is that, in the condensates derived from polybasic acids and from compounds having groups reactive toward acids, there are to be groups remaining that are reactive toward isocyanates, the conduct of the condensation reaction is such that some of the groups reactive toward acids, in particular some of the hydroxy groups, do not react with acid to give the condensate.

The polybasic acid (d) used can also comprise products obtainable via homo- or copolymerization of acrylic acid, methacrylic acid, polyphosphoric acid, polyphosphonic acid, or sulfonic acids, such as styrenesulfonic acid. Suitable comonomers are any of the monomers that are copolymerizable with said acids.

The proportion of the polybasic acid (d), based on the total weight of the compounds (b) having at least two groups reactive toward isocyanates, is preferably from 0.1 to 10% by weight, particularly preferably from 0.5 to 5% by weight, and in particular from 1 to 3% by weight.

Further auxiliaries and additives (e) used can comprise any of the auxiliaries and additives known for producing polyurethanes. Examples that may be mentioned are surfactant substances, release agents, coupling agents, fillers, dyes, pigments, flame retardants, hydrolysis stabilizers, viscosity reducers, water scavengers, antifoaming agents, and also substances having fungistatic and bacteriostatic action. Substances of this type are known and are described by way of example in "Kunststoffhandbuch, Band 7, Polyurethane" [Plastics Handbook, volume 7, Polyurethanes] Carl Hanser Verlag, 3rd edition 1993, chapter 3.4.4 and 3.4.6 to 3.4.11.

Examples of additives that can be used for water adsorption are therefore aluminosilicates, selected from the group of the sodium aluminosilicates, potassium aluminosilicates, calcium silicates, cesium aluminosilicates, barium aluminosilicates, magnesium aluminosilicates, strontium aluminosilicates, sodium aluminophosphates, potassium aluminophosphates, calcium aluminophosphates, and mixtures thereof. It is particularly preferable to use mixtures of sodium aluminosilicates, potassium aluminosilicates, and calcium aluminosilicates in castor oil as carrier substance.

The number-average particle size of the water-absorption additive is preferably not greater than 200 μm, particularly preferably not greater than 150 μm, and in particular not greater than 100 μm. The pore width of the water-absorption additive of the invention is preferably from 2 to 5 Ångstroem.

If a water-absorption additive is added, the amounts here are preferably greater than one part by weight, particularly preferably in the range from 0.5 to 5 parts by weight, based on the total weight of components (b) to (e).

Coupling agents that can be used comprise silanes, such as isocyanate silanes, epoxysilanes, or aminosilanes. Substances of this type are described by way of example in E. P. Plueddemann, Silane Coupling Agents, 2nd ed., Plenum Press, New York, 1991 and in K. L. Mittal, ed., Silanes and Other Coupling Agents, VSP, Utrecht, 1992.

Internal release agents that can be used are any of the conventional release agents used in producing polyurethanes, examples being long-chain carboxylic acids, in particular fatty acids, such as stearic acid, amines of long-chain carboxylic acids, e.g. stearamide, fatty acid esters, metal salts of long-chain carboxylic acids, e.g. zinc stearate, or silicones. Particularly suitable materials are the internal release agents obtainable specifically for the pultrusion process, e.g. from Axel Plastics or Technick Products. The internal release agents from Technick Products probably comprise phosphoric acid and fatty acids. The internal release agents from Axel Plastics probably comprise fatty acids.

Examples of viscosity reducers that can be used are γ-butyrolactone, propylene carbonate, and also reactive diluents, such as dipropylene glycol, diethylene glycol, and tripropylene glycol.

The pultrusion resin system of the invention preferably comprises less than 2% by weight, particularly preferably less than 1% by weight, of substances which have a boiling point below 200° C. at standard pressure. The viscosity of the pultrusion resin system at 25° C. to DIN 53019-1 to 3 immediately after mixing of components (a) to (e) is preferably smaller than 1500 mPas, particularly preferably smaller than 1200 mPas, and in particular smaller than 1000 mPas. The quantitative proportions in which components (a) to (e) are mixed here is preferably such that the isocyanate index is from 90 to 140, particularly preferably from 100 to 130, and in particular from 115 to 125. For the purposes of the present invention, the isocyanate index here is the stoichiometric ratio of isocyanate groups to groups reactive toward isocyanate, multiplied by 100. Groups reactive toward isocyanate here are any of the groups comprised within the reaction mixture that are reactive toward isocyanate, but not the isocyanate group itself.

The present invention also provides a process for producing a pultrudate. In this process, the components of a pultrusion resin system of the invention are mixed to give a polyurethane reaction mixture, and the resultant reaction mixture is used to wet a fiber material. The wetted fiber material is then molded, and the reaction mixture is hardened. For the purposes of this invention, the mixture of components (a) to (e) is termed reaction mixture when conversions in the reaction are smaller than 90%, with respect to the isocyanate groups.

The mixing of the components of the pultrusion resin system of the invention here can take place in a manner conventional for producing polyurethane-based reaction mixtures, for example in the high-pressure or low-pressure process.

The fiber material used can comprise any of the types of continuous-filament fibers. Continuous-filament fiber here means a fiber material the length of which is at least a plurality of meters. These materials are by way of example unwound from rolls. The fiber material used here can comprise individual fibers, known as fiber rovings, braided fibers, fiber mats, fiber scrims, and woven fibers. Particularly in the case of fiber composites, such as braided fibers, twisted fibers, fiber scrims, or woven fibers, there can also be shorter individual fibers comprised within the individual fibers comprised within said fiber structures, but the fiber composite itself must take the form of a continuous-filament material. It is preferable that the fiber material comprises or is composed of glass fiber, glass mats, carbon fiber, polyester fiber, natural fiber, aramid fiber, basalt fiber, or nylon fiber, and it is particularly preferable to use carbon fibers or glass fibers.

The wetting of the fiber material here can take place in an open die or preferably in a closed die. The temperature during wetting of the fiber material is preferably below 100° C., preferably from 0 to 75° C., particularly preferably from 10 to 50° C., and in particular from 15 to 35° C. The proportion of fiber material here is preferably from 10 to 90% by weight, particularly preferably from 30 to 90% by weight, in particular from 60 to 90% by weight, based on the finished pultrudate.

After the wetting process, the fiber material wetted with the reaction mixture is preferably drawn through a die. This die can have any desired cross-sectional shape, perpendicularly with respect to the direction of draw of the wetted fiber material, but this shape is preferably as constant as possible, for example slot-shaped or circular, or L-shaped or T-shaped, or else of a more complex shape. The temperature of this die is preferably from 150 to 250° C., and the polyurethane reaction mixture therefore hardens to give the finished polyurethane.

It is preferable that the pultrudate is drawn out of the die at a speed of more than one meter per minute. The take-off speed is particularly preferably more than 1.5 meters per minute and in particular more than 2.0 meters per minute. The resultant pultrudate is usually cut to the desired length.

The present invention also provides a pultrudate, obtainable by the process of the invention. This pultrudate has excellent surface quality and quality of wetting. The mechanical properties of the pultrudates are identical for take-off speeds of 0.5 m/min and take-off speeds of 1.5 m/min.

Examples will be used below to illustrate the invention:

The following materials were used:

Polyols

Polyol 1: Glycerol-started triol, propoxylated, OHN: 400 mg KOH/g

Polyol 2: Glycerol-started triol, propoxylated, OHN: 800 mg KOH/g

Polyol 3: Diol, propylene glycol, propoxylated, OHN: 250 mg KOH/g

Polyol 4: Glycerol-started triol, propoxylated and ethoxylated, OHN: 42 mg KOH/g, with proportion of 72.5% by weight of ethylene oxide Catalyst:

Catalyst 1: Mixture of 1,8-diazabicyclo[5.4.0]undec-7-ene and phenol in diethylene glycol Catalyst 2: Dimethyltin carboxylate Catalyst 3: Phenylmercury neodecanoate Catalyst 4: 1,8-Diazabicyclo[5.4.0]undec-7-ene Catalyst 5: Mixture of 1,8-diazabicyclo[5.4.0]undec-7-ene and phthalic acid in monoethylene glycol Release Agent:

TL-550 HB from Technick Products, INT-1947MCH or INT-1948MCH from Axel Plastics, all of which are commercially available internal release agents for the pultrusion process.

Polymeric Acids:

Acid 1: Acid based on esters of phthalic acid with glycols. Acid number=130 mg KOH/g Acid 2: Acid based on esters of phthalic acid with a triol based on propylene oxide and glycerol as starter, with OH number 400 mg KOH/g. Acid number=190 mg KOH/g Isocyanates:

Monomeric MDI, based on 2,4- and 4,4'-MDI

Polymeric MDI with viscosity of 210 mPas at 25° C.

Method:

The pultrusion plant used comprised a closed injection box and a heatable die. The internal diameter of the flat profile in the die was 3×50 mm. Pultrudates having these dimensions were correspondingly produced. Standard glass fibers suitable for the pultrusion process were used (for example from PPG Fiber Glass Europe: Hybon 2001 Roving, 2400 Tex) and drawn through the injection box and die. Glassfiber mats were also used (for example from PPG Fiber Glass Europe, the ratio of glassfiber rovings to glassfiber mats being 60:20% by weight). The total concentration of the reinforcement material, based on the total weight of the pultrudate, was about 80% by weight. The starting materials stated in the inventive examples and comparative examples were mixed at room temperature in a low-pressure mixing machine using a static mixer and the stated isocyanate index. The reaction mixture was then injected into the injection box, thus wetting the glass fibers with the reaction mixture. The wetted glass fibers were drawn continuously through the die by means of a take-off system, and the polyurethane system was cured in the heated die.

At the end of the process, the profiles are cut to the desired lengths.

EXAMPLES

The proportions of components A and B are stated below as parts by weight.

Inventive Example 1

| Component A | | Component B | |
|---|---|---|---|
| Polyol 1 | 75.0 | Polymeric MDI | 100 |
| Dipropylene glycol | 20.0 | | |
| Catalyst 1 | 1.0 | | |
| Acid 1 | 2.0 | | |
| INT-1948MCH | 5.0 | | |

Index: 100
System characteristics:
Gel time at room temperature: 17:00 min
Reactivity at 220° C.: 15 s
Results of pultrusion trials:
Pultrusion speed: 1.5 m/min
Surface quality: very good, no powder

Comparative Example 1

| Component A | | Component B | |
|---|---|---|---|
| Polyol 1 | 75.0 | Polymeric MDI | 100 |
| Dipropylene glycol | 20.0 | | |
| Catalyst 1 | 1.0 | | |
| INT-1948MCH | 5.0 | | |

Index: 100
System Characteristics:
Gel time at room temperature: 17:00 min
Reactivity at 220° C. 22 s
Results of pultrusion trials:
Pultrusion speed: 1.0 m/min
Surface quality: good, no powder

Inventive Example 2

| Component A | | Component B | |
|---|---|---|---|
| Polyol 2 | 75.0 | Polymeric MDI | 100 |
| Polyol 3 | 10.0 | | |
| Polyol 4 | 10.0 | | |
| Catalyst 2 | 1.0 | | |
| Acid 1 | 2.0 | | |
| INT-1947MCH | 5.0 | | |

Index: 110
System characteristics:
Gel time at room temperature: 12:20 min
Hardening at 220° C. 30 s
Results of pultrusion trials:
Pultrusion speed: 1.5 m/min
Surface quality: good, little powder

Comparative Example 2

| | | | |
|---|---|---|---|
| Polyol 2 | 75.0 | Polymeric MDI | 100 |
| Polyol 3 | 10.0 | | |
| Polyol 4 | 10.0 | | |
| Catalyst 2 | 1.0 | | |
| INT-1947MCH | 5.0 | | |

Index: 110
System characteristics:
Gel time at room temperature: 11:15 min
Hardening at 220° C. 31 s
Results of pultrusion trials:
Pultrusion speed: 1.5 m/min
Surface quality: rough, large amount of powder

Inventive Example 3

| Component A | | Component B | |
|---|---|---|---|
| Polyol 1 | 50.0 | Polymeric MDI | 80 |
| Polyol 2 | 45.0 | Monomeric MDI | 20 |
| Catalyst 3 | 0.2 | | |

-continued

| Component A | | Component B |
|---|---|---|
| Acid 1 | 2.0 | |
| INT-1947MCH | 5.0 | |

Index: 120
System characteristics:
Gel time at room temperature: 18:00 min
Hardening at 220° C. 20 s
Results of pultrusion trials:
Pultrusion speed: 2.5 m/min
Surface quality: very good, smooth surface, no powder Comparative Example 3

| Component A | | Component B | |
|---|---|---|---|
| Polyol 1 | 50.0 | Polymeric MDI | 80 |
| Polyol 2 | 45.0 | Monomeric MDI | 20 |
| Catalyst 3 | 0.2 | | |
| INT-1947MCH | 5.0 | | |

Index: 120
System characteristics:
Gel time at room temperature: 12:00 min
Hardening at 220° C. 37 s
Results of pultrusion trials:
Pultrusion speed: 1.5 m/min
Surface: very good, smooth surface, no powder Inventive Example 4

| Component A | | Component B | |
|---|---|---|---|
| Polyol 1 | 75.0 | polymeric MDI | 100 |
| Dipropylene glycol | 20.0 | | |
| Catalyst 4 | 0.5 | | |
| Acid 2 | 1.5 | | |
| TL-550 HB | 5.0 | | |

Index: 100
System characteristics:
Gel time at room temperature: 15:30 min
Hardening at 220° C. 15 s
Results of pultrusion trials:
Pultrusion speed: 2.0 m/min
Surface quality: good, little powder Comparative Example 4

| Component A | | Component B | |
|---|---|---|---|
| Polyol 1 | 75.0 | polymeric MDI | 100 |
| Dipropylene glycol | 20.0 | | |
| Catalyst 4 | 0.5 | | |
| TL-550 HB | 5.0 | | |

Index: 100
System characteristics:
Gel time at room temperature: 15:25 min
Hardening at 220° C. 28 s
Results of pultrusion trials:
Pultrusion speed: 2.0 m/min
Surface quality: rough, powder Inventive Example 5

| Component A | | Component B | |
|---|---|---|---|
| Polyol 1 | 75.0 | polymeric MDI | 100 |
| Dipropylene glycol | 20.0 | | |
| Catalyst 5 | 1.0 | | |
| Acid 1 | 2.0 | | |
| INT-1948MCH | 5.0 | | |

Index: 100
System characteristics:
Gel time at room temperature: 18:45 min
Hardening at 220° C. 28 s
Results of pultrusion trials:
Pultrusion speed: 2.0 m/min
Surface quality: rough, powder Comparative Example 5

| Component A | | Component B | |
|---|---|---|---|
| Polyol 1 | 75.0 | polymeric MDI | 100 |
| Dipropylene glycol | 20.0 | | |
| Catalyst 5 | 1.0 | | |
| INT-1948MCH | 5.0 | | |

Index: 100
System characteristics:
Gel time at room temperature: 18:00 min
Hardening at 220° C. 37 s
Results of pultrusion trials:
Pultrusion speed: 1.5 m/min
Surface quality: rough, powder The examples show that, when other conditions are identical, addition of the polybasic acid improves the surfaces of the resultant pultrudates or, respectively, addition of the polybasic acid achieves consistently good surface qualities at higher process speeds.

The invention claimed is:
1. A pultrusion resin system, comprising
  a) a di- or polyisocyanate,
  b) a compound having at least two groups reactive toward an isocyanate,
  c) a catalyst,
  d) a polybasic acid having a functionality greater than or equal to 2 and,
  optionally,
  e) a further auxiliary or additive,
  where a boiling point of the polybasic acid is at least 200° C. at standard pressure and the polybasic acid is soluble in the compound having at least two groups reactive toward an isocyanate.
2. The pultrusion resin system of claim 1, wherein an acid number of the polybasic acid is 50 to 1000 mg KOH/g.

3. The pultrusion resin system of claim 1, wherein a molar ratio of oxygen atoms to carbon atoms in the polybasic acid is at least 1:5.

4. The pultrusion resin system of claim 1, wherein the polybasic acid is a condensate comprising, in reacted form, an at least dibasic acid and a compound having a group reactive toward acid.

5. The pultrusion resin system of claim 1, wherein a proportion of the polybasic acid, based on a total weight of the compound having at least two groups reactive toward an isocyanate and of the polybasic acid is 0.1 to 10% by weight.

6. The pultrusion resin system of claim 1, wherein the polybasic acid has at least one further group having a functionality toward an isocyanate.

7. The pultrusion resin system of claim 1, wherein the di- or polyisocyanate comprises polymeric MDI having an average functionality of 2.1 to 2.8.

8. The pultrusion resin system of claim 1, wherein the compound having at least two groups reactive toward an isocyanate comprises a polyetherol having an average functionality of 2 to 4 and having a content of secondary OH groups of at least 50%.

9. The pultrusion resin system of claim 1, wherein the average OH number of the compound having at least two groups reactive toward an isocyanate is 100 to 1000 mg KOH/g.

10. The pultrusion resin system of claim 1, wherein a viscosity is less than 1500 mPas at 25° C. immediately after mixing of components (a) to (e).

11. The pultrusion resin system of claim 1, comprising less than 2.0% by weight of substances which have a boiling point of less than 200° C. at standard pressure.

12. A process for producing a pultrudate, comprising:
    mixing the pultrusion resin system of claim 1, to obtain a reaction mixture;
    wetting a fiber material with the reaction mixture, to obtain a wetted fiber material; and
    hardening the wetted fiber material.

13. The process of claim 12, wherein the wetted fiber material is drawn through a die and hardened, where a temperature of the die is 150° C. to 250° C.

14. The process of claim 13, wherein a take-off speed at which the wetted fiber material is drawn through the die is greater than one meter per minute.

15. The process of claim 12, wherein the pultrudate comprises 30 to 90% by weight of the fiber material.

16. A pultrudate produced by the process of claim 12.

17. The pultrusion resin system of claim 8, wherein the polyetherol has an average functionality of 2.8 to 3.2.

18. The pultrusion resin system of claim 1, comprising 0.05 to 10% by weight of the catalyst, based on a total weight of components (b) to (e).

19. The pultrusion resin system of claim 1, comprising 0.1 to 2.5% by weight of the catalyst, based on a total weight of components (b) to (e).

20. The pultrusion resin system of claim 1, wherein an acid number of the polybasic acid is 100 to 800 mg KOH/g.

* * * * *